US012097833B2

(12) United States Patent
Yokoyama et al.

(10) Patent No.: US 12,097,833 B2
(45) Date of Patent: Sep. 24, 2024

(54) ELECTRIC BRAKE, AND CONTROL DEVICE

(71) Applicant: Hitachi Astemo, Ltd., Ibaraki (JP)

(72) Inventors: Wataru Yokoyama, Yokohama (JP); Daisuke Goto, Atsugi (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 561 days.

(21) Appl. No.: 17/276,955

(22) PCT Filed: Sep. 12, 2019

(86) PCT No.: PCT/JP2019/035822
§ 371 (c)(1),
(2) Date: Mar. 17, 2021

(87) PCT Pub. No.: WO2020/066645
PCT Pub. Date: Apr. 2, 2020

(65) Prior Publication Data
US 2022/0032885 A1 Feb. 3, 2022

(30) Foreign Application Priority Data
Sep. 26, 2018 (JP) ................................ 2018-180345

(51) Int. Cl.
*B60T 8/17* (2006.01)
*B60T 13/74* (2006.01)
(Continued)

(52) U.S. Cl.
CPC .............. *B60T 8/17* (2013.01); *B60T 13/746* (2013.01); *B60T 17/221* (2013.01);
(Continued)

(58) Field of Classification Search
CPC ........ B60T 8/17; B60T 13/746; B60T 17/221; B60T 2201/12; F16D 55/226;
(Continued)

(56) References Cited

U.S. PATENT DOCUMENTS

| 6,250,436 B1 | 6/2001 | Oikawa et al. |
| 2009/0032342 A1* | 2/2009 | Yamaguchi ........... B60T 13/741 |
| | | 188/72.3 |

(Continued)

FOREIGN PATENT DOCUMENTS

JP 2000-046082 2/2000

OTHER PUBLICATIONS

Extended European Search Report issued Oct. 7, 2021 in corresponding European Patent Application No. 19864155.7.

(Continued)

*Primary Examiner* — Jelani A Smith
*Assistant Examiner* — Nada Mahyoob Alqaderi
(74) *Attorney, Agent, or Firm* — Wenderoth, Lind & Ponack, L.L.P.

(57) ABSTRACT

Provided is an electric brake including: a brake mechanism configured to transmit, based on a braking request, a thrust force generated through drive of an electric motor to a piston configured to move brake pads to be pressed against a disc rotor; and an ECU for rear electric brake configured to control the drive of the electric motor, and to move, in a non-braking state, the piston to a predetermined clearance position at which a clearance between each of the brake pads and the disc rotor is a predetermined amount. The ECU for rear electric brake is configured to drive the electric motor so that a period from generation of the braking request to a start of the pressing of the disc rotor by the brake pads is a predetermined period regardless of a position of the piston at a time when the braking request is generated.

4 Claims, 13 Drawing Sheets

(51) Int. Cl.
*B60T 17/22* (2006.01)
*F16D 55/226* (2006.01)
*F16D 65/18* (2006.01)
*F16D 66/00* (2006.01)
*F16D 125/40* (2012.01)
*F16D 55/00* (2006.01)
*F16D 65/38* (2006.01)
*F16D 121/24* (2012.01)
*F16D 125/48* (2012.01)
*F16D 125/50* (2012.01)
*F16D 127/02* (2012.01)

(52) U.S. Cl.
CPC ........... *F16D 55/226* (2013.01); *F16D 65/18* (2013.01); *F16D 66/00* (2013.01); B60T 2201/12 (2013.01); F16D 2055/0029 (2013.01); F16D 2065/386 (2013.01); F16D 2066/003 (2013.01); F16D 2121/24 (2013.01); F16D 2125/40 (2013.01); F16D 2125/48 (2013.01); F16D 2125/50 (2013.01); F16D 2127/02 (2013.01)

(58) Field of Classification Search
CPC .. F16D 65/18; F16D 66/00; F16D 2055/0029; F16D 2065/386; F16D 2066/003; F16D 2121/24
See application file for complete search history.

(56) References Cited

U.S. PATENT DOCUMENTS

| | | | | |
|---|---|---|---|---|
| 2016/0214595 | A1* | 7/2016 | Baehrle-Miller | B60T 7/22 |
| 2018/0056997 | A1* | 3/2018 | Ohmura | B60W 10/20 |
| 2018/0099651 | A1* | 4/2018 | Yogo | F16D 55/226 |
| 2019/0039579 | A1* | 2/2019 | Ohkubo | B60T 13/586 |
| 2019/0054903 | A1* | 2/2019 | Blattert | B60T 7/12 |
| 2019/0061713 | A1* | 2/2019 | Ohkubo | F16D 65/183 |
| 2019/0232790 | A1* | 8/2019 | Honda | B60L 7/26 |
| 2020/0023823 | A1* | 1/2020 | Baehrle-Miller | B60T 8/321 |

OTHER PUBLICATIONS

International Search Report issued Dec. 3, 2019 in International (PCT) Application No. PCT/JP2019/035822 with English translation.
Written Opinion of the International Searching Authority issued Dec. 3, 2019 in International (PCT) Application No. PCT/JP2019/035822 with English translation.

* cited by examiner

ELECTRIC BRAKE, AND CONTROL DEVICE

TECHNICAL FIELD

The present invention relates to an electric brake configured to apply a braking force to a vehicle, for example, an automobile, and a control device to be used for an electric brake.

BACKGROUND ART

An electric brake is configured to secure a clearance between each of pads (braking members) and a disc (braked member) when a brake pedal is not operated or when an operation of releasing a braking force is executed, to thereby suppress drag of the brake pads. Moreover, in Patent Literature 1, there is disclosed an electric brake configured to reduce a clearance between each of pads and a disc when a vehicle is traveling and an OFF operation is applied to the accelerator pedal, to thereby increase responsiveness.

CITATION LIST

Patent Literature

PTL 1: JP 2000-46082 A

SUMMARY OF INVENTION

Technical Problem

The electric brake operates the pads toward directions for reducing the clearances (directions toward the disc) when the brake pedal is operated to generate the braking force, to thereby generate a braking request. As a result, the pads are brought into contact with the disc, to thereby generate the braking force. However, for example, there may occur a case in which, for example, each of the clearance amounts at the time when the brake pedal is operated to generate the braking force while the clearances are being secured and each of the clearance amounts at the time when the clearances have already been secured are different from each other. As a result, a timing at which the braking force is generated changes depending on each of the clearance amounts at the time when the brake pedal is operated, and there is thus a fear in that a driver may feel a sense of discomfort.

Solution To Problem

An object of the present invention is to provide an electric brake and a control device which are capable of suppressing a difference in time of generation of a braking force even when a braking request is generated under a state in which each of clearance amounts between each braking member and a braked member changes.

According to one embodiment of the present invention, there is provided an electric brake including: a brake mechanism configured to transmit, based on a braking request, a thrust force generated through drive of an electric motor to a piston configured to move braking members to be pressed against a braked member; and a control device configured to control the drive of the electric motor, and to move, in a non-braking state, the piston to a predetermined clearance position at which a clearance between each of the braking members and the braked member is a predetermined amount, wherein the control device is configured to drive the electric motor so that a period from generation of the braking request to a start of the pressing of the braked member by the braking members is a predetermined period regardless of a position of the piston at a time when the braking request is generated.

Further, according to one embodiment of the present invention, there is provided a control device, the control device being configured to: control drive of an electric motor of a brake mechanism configured to transmit, based on a braking request, a thrust force generated through drive of the electric motor to a piston configured to move braking members to be pressed against a braked member; and drive the electric motor so that a period from generation of the braking request to a start of the pressing of the braked member by the braking members is a predetermined period regardless of a position of the piston at a time when the braking request is generated.

According to one embodiment of the present invention, it is possible to suppress the difference in time of generation of the braking force even when the braking request is generated under the state in which each of the clearance amounts between each braking member and the braked member changes.

DESCRIPTION OF THE EMBODIMENTS

With reference to the accompanying drawings, description is now given of an example in which electric brakes according to embodiments are applied to a four-wheeled vehicle.

Figure 1:
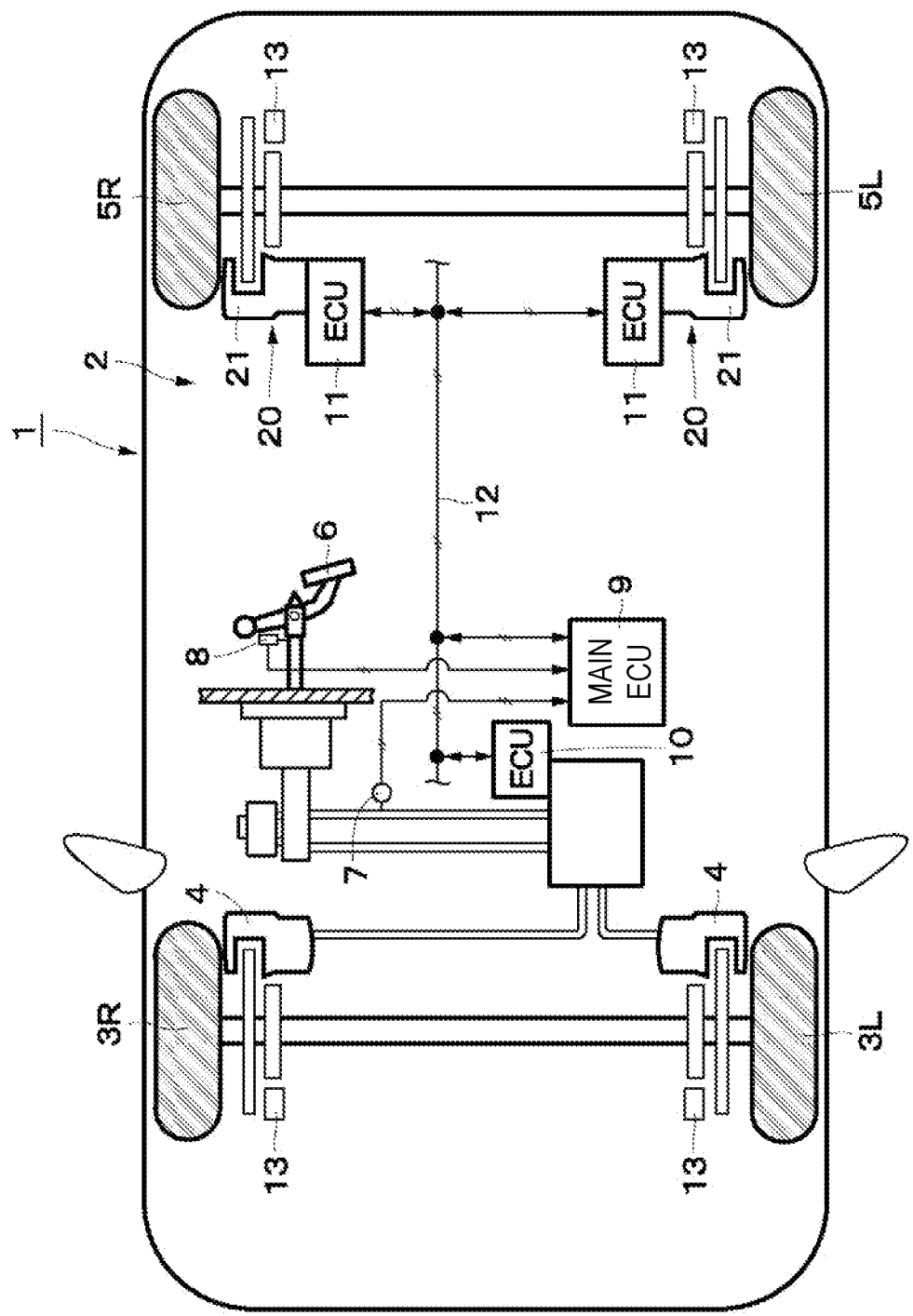
FIG. 1 is a diagram for illustrating a system configuration of a vehicle to which an electric brake according to first to third embodiments of the present invention is applied.

FIG. 1 is a diagram for illustrating a system configuration of a vehicle 1 to which electric brakes 20 according to the embodiments are applied. A brake device 2 mounted to the vehicle 1 includes hydraulic brakes 4 (front brake mechanisms) provided in correspondence to a front wheel 3L on the left side and a front wheel 3R on the right side and the electric brakes 20 (rear brake mechanisms) provided in correspondence to a rear wheel 5L on the left side and a rear wheel 5R on the right side. Moreover, a main ECU 9 is connected to a hydraulic pressure sensor 7 and a pedal stroke sensor 8 which are configured to measure an operation amount of a brake pedal 6 by a driver. The main ECU 9 receives input of signals from the hydraulic pressure sensor 7 and the pedal stroke sensor 8, and then calculates a target braking force for each of the wheels (four wheels) through a control program defined in advance. The main ECU 9 transmits, based on the calculated braking forces, a brake command directed to each of the two front wheels to an ECU 10 for front hydraulic device via a controller area network (CAN) 12. The main ECU 9 transmits, based on each of the calculated braking forces, a brake command directed to each of the two rear wheels to each ECU 11 for rear electric brake via the CAN 12. Moreover, the main ECU 9 is connected to wheel speed sensors 13 each provided in a vicinity of each of the front wheels 3L and 3R and the rear wheels 5L and 5R, and can thus detect a wheel speed of each wheel. The ECU 11 for rear electric brake forms a control device configured to control drive of an electric motor 39 based on the brake command.

Figure 2:
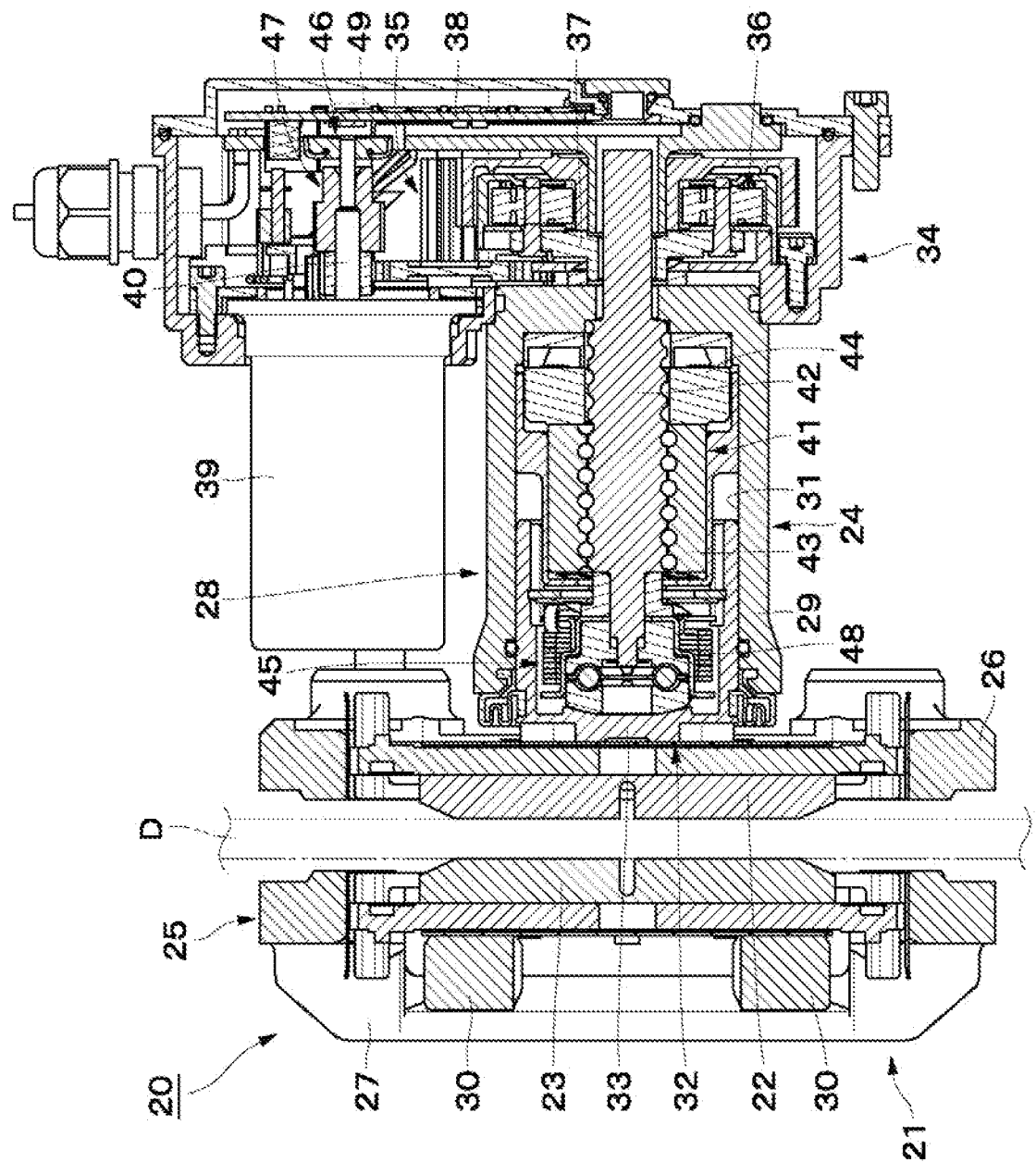
FIG. 2 is a cross-sectional view for illustrating the electric brake.

With reference to FIG. 1 and FIG. 2, description is now given of a specific configuration of the electric brake 20.

The electric brake 20 includes a brake mechanism 21 and the ECU 11 for rear electric brake. The brake mechanism 21 is configured to transmit a thrust force generated through drive of the electric motor 39 to a piston 32 configured to move brake pads 22 and 23 (braking members) to be pressed against a disc rotor D (braked member) based on a braking request. The ECU 11 for rear electric brake serves as a control device that is configured to control the drive of the electric motor 39 and to move, in a non-braking state, the piston 32 to a predetermined clearance position at which a clearance between each of the brake pads 22 and 23 and the disc rotor D is a predetermined amount. Moreover, the electric brake 20 includes a thrust force sensor 44 and a rotational angle sensor 46. The thrust force sensor 44 is configured to detect a thrust force applied to the piston 32. The rotational angle sensor 46 is configured to detect a rotational position of the electric motor 39.

As illustrated in FIG. 2, the brake mechanism 21 includes a pair of an inner brake pad 22 and an outer brake pad 23, and a caliper 24. The inner brake pad 22 and the outer brake pad 23 are arranged on both sides of the disc rotor D in an axial direction thereof. The disc rotor D is mounted to a rotating portion of the vehicle 1. The electric brake 20 is configured as a floating caliper type brake. The pair of the inner brake pad 22 and the outer brake pad 23 and the caliper 24 are supported by a bracket 25 fixed to a non-rotating portion, for example, a knuckle of the vehicle 1.

The bracket 25 includes an inner-side support portion 26 and an outer-side support portion 27 configured to independently support the inner brake pad 22 and the outer brake pad 23, respectively. The inner brake pad 22 is supported inside the inner-side support portion 26 so as to be movable along the axial direction of the disc rotor D. The outer brake pad 23 is supported inside the outer-side support portion 27 so as to be movable along the axial direction of the disc rotor D.

The caliper 24 includes a caliper main body 28 and the electric motor 39. The caliper main body 28 is a main body of the caliper 24. The electric motor 39 is arranged side by side with the caliper main body 28. In the caliper main body 28, a cylinder portion 29 and claw portions 30 are integrally formed. The cylinder portion 29 is cylindrical, and is arranged on a base end portion opposed to the inner brake pad 22 on an inner side of the vehicle and is opened so as to be opposed to the inner brake pad 22. The claw portions 30 extend from the cylinder portion 29 toward the outer side across the disc rotor D, and are then arranged on a distal end side opposed to the outer brake pad 23 on an outer side of the vehicle.

A bottomed cylinder 31 is formed in the cylinder portion 29. The piston 32 is configured to press the inner brake pad 22, and is formed into a bottomed cup shape. The piston 32 is accommodated in the cylinder 31 so that a bottom portion 33 thereof is opposed to the inner brake pad 22.

A gear housing 34 is arranged on a bottom wall side of the cylinder portion 29 of the caliper main body 28. A spur gear multistage speed reduction mechanism 35, a planetary gear speed reduction mechanism 36, and a control board 38 are accommodated inside the gear housing 34. The ECU 11 for rear electric brake serving as the control device formed of, for example, a microcomputer, is mounted on the control board 38.

The ECU 11 for rear electric brake controls the drive of the electric motor 39 based on the brake command. Moreover, the ECU 11 for rear electric brake executes programs stored in advance in a memory (not shown). The programs include a program for clearance control illustrated in FIG. 6 and FIG. 7.

The caliper main body 28 includes the electric motor 39, the spur gear multistage speed reduction mechanism 35, the planetary gear speed reduction mechanism 36, a ball screw mechanism 41, the thrust force sensor 44, a return mechanism 45, the rotational angle sensor 46, and a thrust force holding mechanism 47. The spur gear multistage speed reduction mechanism 35 and the planetary gear speed reduction mechanism 36 are transmission mechanisms configured to increase a rotational torque transmitted from the electric motor 39. The rotation is transmitted from the spur gear multistage speed reduction mechanism 35 and the planetary gear speed reduction mechanism 36 to the ball screw mechanism 41, and the ball screw mechanism 41 then applies the thrust force to the piston 32. The thrust force sensor 44 is configured to detect a reaction force of the thrust force (pressing force). The thrust force is applied from the piston 32 to the inner brake pad 22 and the outer brake pad 23. The return mechanism 45 is configured to accumulate, when a push rod 42 of the ball screw mechanism 41 propels the piston 32, a rotational force for the push rod 42 toward the retracting direction. The rotational angle sensor 46 is configured to detect a rotational angle of a rotating shaft 40 of the electric motor 39. The thrust force holding mechanism 47 is configured to hold the thrust force applied from the piston 32 to the inner brake pad 22 and the outer brake pad 23 during the braking. The thrust force sensor 44 forms a thrust force detection unit configured to detect the thrust force applied to the piston 32. The thrust force sensor 44 is arranged so as to be sandwiched between a base nut 43 forming the ball screw mechanism 41 and a bottom portion of the cylinder 31.

The spur gear multistage speed reduction mechanism 35 and the planetary gear speed reduction mechanism 36 reduce the rotational speed and increase the rotational torque of the rotation of the electric motor 39 at a predetermined reduction ratio, and transmit the rotation to a carrier 37 of the planetary gear speed reduction mechanism 36. The rotation of the carrier 37 is transmitted to the push rod 42 of the ball screw mechanism 41.

The ball screw mechanism 41 is configured to convert the rotational motion transmitted from the spur gear multistage speed reduction mechanism 35 and the planetary gear speed reduction mechanism 36, that is, the rotational motion of the electric motor 39, to a rectilinear motion (hereinafter referred to as "linear motion" for the sake of convenience), to thereby apply the thrust force to the piston 32. The ball screw mechanism 41 is formed of the push rod 42 and the base nut 43. The rotational motion from the spur gear multistage speed reduction mechanism 35 and the planetary gear speed reduction mechanism 36 is transmitted to the push rod 42 serving as a shaft member. The base nut 43 serving as a nut member is threadedly engaged with an outer peripheral surface of the push rod 42. The base nut 43 is fitted through a fitting portion (not shown) so as not to rotate relative to the cylinder 31. The push rod 42 can advance while pressing the base nut 43 against the thrust force sensor 44 and rotating relative to the base nut 43. Further, the push rod 42 is connected to the piston 32 via a thrust bearing mounted to a distal end so as to be able to relatively rotate. As a result, the piston 32 can be advanced, and the inner brake pad 22 can consequently be pressed against the disc rotor D by the piston 32.

The return mechanism 45 is sometimes also referred to as "fail open mechanism." The return mechanism 45 is configured to release the braking force applied by the piston 32 from the inner pad 22 and the outer part 23 to the disc rotor D when the electric motor 39, the control board 38, or the like fails during the braking.

The rotational angle sensor 46 is configured to detect the rotational angle of the rotating shaft 40 of the electric motor 39. The rotational angle sensor 46 includes a magnet member (not shown) and a magnetism-detecting IC chip (not shown). The magnet member is mounted to the rotating shaft 40 of the electric motor 39. The rotational angle of the rotating shaft 40 of the electric motor 39 can be calculated and detected by the control board 38 through detection of a change in magnetic flux generated from the rotating magnet member by the magnetism-detecting IC chip. The rotational angle sensor 46 forms a rotational position detection unit configured to detect the rotational position of the electric motor 39.

A return spring 48 is formed of a coil spring. The return spring 48 can accumulate the rotational force for the push rod 42 toward the retracting direction. A current sensor 49 is mounted inside a motor drive circuit on the control board 38 so as to be able to detect a motor current supplied to the electric motor 39. The current sensor 49 outputs a signal corresponding to the motor current.

Description is now given of actions of the braking and release of the braking in the electric brake 20 during normal travel.

At the time of the braking during the normal travel, the electric motor 39 is driven in accordance with a command from the ECU 11 for rear electric brake. The rotation in a forward direction, that is, a braking direction (thrust force increasing direction), of the electric motor 39 is reduced in speed and increased in torque at the predetermined reduction ratio through the spur gear multistage speed reduction mechanism 35 and the planetary gear speed reduction mechanism 36, and is then transmitted to the carrier 37 of the planetary gear speed reduction mechanism 36. The rotation of the carrier 37 is transmitted to the push rod 42 of the ball screw mechanism 41.

When the push rod 42 then starts rotating as the carrier 37 rotates, the push rod 42 advances while pressing the base nut 43 against the thrust force sensor 44 and rotating relative to the base nut 43. When the push rod 42 advances while rotating relative to the base nut 43, the piston 32 advances. The inner brake pad 22 is pressed against the disc rotor D by the piston 32. The caliber main body 28 is moved toward the right direction of FIG. 2 with respect to the bracket 25 by the reaction force of the pressing force applied to the inner brake pad 22 by the piston 32. The outer braked pad 23 mounted to the claw portions 30 is consequently pressed against the disc rotor D. As a result, the disc rotor D is clamped by the inner brake pad 22 and the outer brake pad 23, and a friction force is thus generated. Then, the braking force to be applied to the vehicle 1 is consequently generated.

When the disc rotor D is maintained to be clamped by the inner brake pad 22 and the outer brake pad 23, and the generation of the braking force thus starts, the reaction force thereof is applied to the thrust force sensor 44 from the inner brake pad 22 side via the push rod 42 and the base nut 43 and from the outer brake pad 23 side via the claw portions 30 and the bottom portion of the cylinder 31. The thrust force applied from the inner brake pad 22 and the outer brake pad 23 to the disc rotor D by the advancement of the piston 32 is detected by the thrust force sensor 44.

Subsequently, the rotational force for the push rod 42 toward the retracting direction is accumulated in the return spring 48. After that, the drive of the electric motor 39 is controlled in accordance with detection signals from the rotational angle sensor 46, the thrust force sensor 44, and the like, to thereby establish the braking state.

Meanwhile, at the time of the release of the braking, the rotating shaft 40 of the electric motor 39 is rotated in an opposite direction, that is, a braking release direction (thrust force reducing direction), in accordance with a command from the ECU 11 for rear electric brake. Further, the rotation in the opposite direction is transmitted to the push rod 42 via the spur gear multistage speed reduction mechanism 35 and the planetary gear speed reduction mechanism 36. As a result, the push rod 42 starts retracting while relatively rotating in the opposite direction, to thereby reduce the thrust force applied to the disc rotor D. The caliper main body 28 moves toward the left direction of FIG. 2 with respect to the bracket 25, and the piston 32 retracts by a restoring force of the inner brake pad 22 and the outer brake pad 23 compressed by the thrust force. As a result, the return spring 48 returns to an initial state, and the braking force applied to the disc rotor D by the inner brake pad 22 and the outer brake pad 23 is released.

The retraction of the piston 32 by the restoring force of the pads continues until the restoring force applied by the inner brake pad 22 and the outer brake pad 23 matches a sum of sliding resistances existing between the respective pads and the bracket and a sliding resistance existing between the piston 32 and the cylinder 31. In order to further retract the piston 32 subsequently, it is required to further drive the electric motor 39 toward the thrust force reducing direction to further retract the push rod 42, to thereby transmit the force so that the piston 32 retracts via a retaining ring. The retaining ring is fitted to a groove existing in an inner wall surface of the piston, and is configured to restrict a relative displacement amount between the piston 32 and the push rod 42 in the direction of the linear motion.

A remaining thrust force between the inner brake pad 22 and the outer brake pad 23, and the disc rotor D is generated under the state in which the inner brake pad 22 and the outer brake pad 23 do not retract any more due to the sliding resistances between the pads and the bracket and between the piston 32 and the cylinder 31. The remaining thrust force becomes a resistance torque (drag torque) when the disc rotor D rotates, and thus influences the fuel consumption of the vehicle. To deal with this problem, in the electric brake 20, when the brake command from the main ECU 9 is finished, or does not exist, a gap (clearance) is formed between the piston 32 and the inner brake pad 22 by driving the electric motor 39 toward the thrust force reducing direction so as to reduce the remaining thrust force, to thereby be able to reduce the drag torque. It is also possible to form the clearance between the disc rotor D and the inner brake pad 22 by fitting the piston 32 and the inner brake pad 22 to each other so that the piston 32 and the inner brake pad 22 integrally move linearly (not shown). It is also possible to form a clearance between the disc rotor D and the outer brake pad 23 through, for example, a method of providing, between the inner brake pad 22 and the outer brake pad 23, a spring biased toward the directions away from the disc rotor D. It is possible to further reduce the drag torque through those methods.

Figure 3:
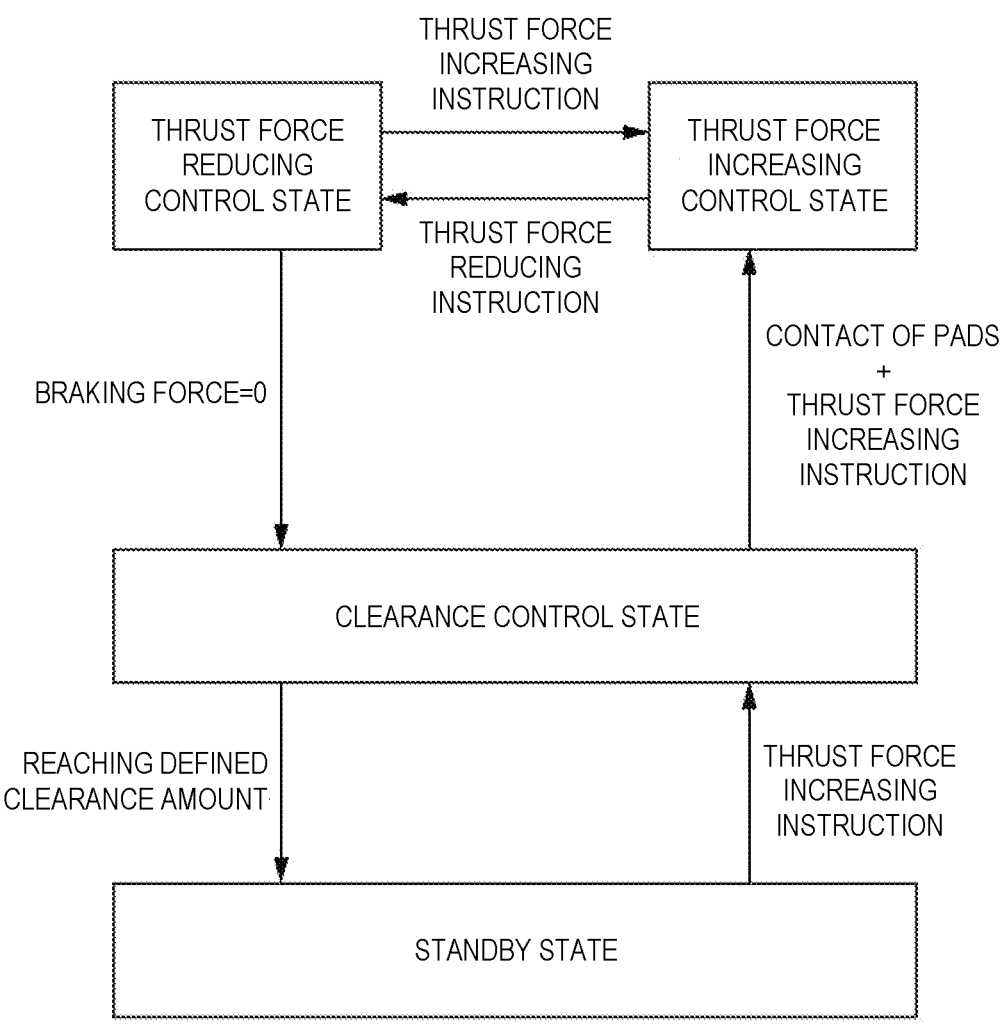
FIG. 3 is a state transition diagram for illustrating control states of the electric brake.

FIG. 3 is an example of a state transition diagram during the control of the electric brake 20. The electric brake 20 is in any one of a standby state, a clearance control state, a thrust force increasing control state, and a thrust force reducing control state during the control of the electric brake 20. The electric brake 20 executes control in accordance with those states. Conditions for transition to each state are as illustrated in FIG. 3. When each of the conditions for transition is satisfied, the state transitions.

Immediately after the start, the electric brake 20 enters the standby state when a series of system checks has been completed. For example, when the driver executes an operation of depressing the brake pedal 6 (braking force generation operation) under the standby state, a thrust force increasing instruction is generated by the operation on the brake pedal 6, and the electric brake 20 transitions from the standby state to the clearance control state. After the transition to the clearance control state, the electric brake 20 executes control of reducing the clearances. When the clearances become zero, the electric brake 20 determines that the brake pads 22 and 23 are in contact with the disc rotor D. When the thrust force increasing instruction continues after the determination, the electric brake 20 transitions from the clearance control state to the thrust force increasing control state. Under the thrust force increasing control state, the electric brake 20 causes the electric motor 39 to drive such that the piston 32 is propelled toward a thrust force increasing direction until the braking force reaches a target braking force corresponding to an operation amount of the brake pedal 6 by the driver. When the braking force reaches the target braking force, the electric brake 20 executes control of maintaining this braking force, and waits under the thrust force increasing control state until a thrust force reducing instruction is generated.

When an operation on a side of releasing the brake pedal 6 (braking force releasing operation) is executed under the thrust force increasing control state, the thrust force reducing instruction is generated, and the electric brake 20 transitions from the thrust force increasing control state to the thrust force reducing control state. In this transition, the electric brake 20 reduces the thrust force until the braking force reaches a target braking force corresponding to the operation on the brake pedal 6, and then maintains the braking force. When the braking force reaches the target braking force under a state in which the foot of the driver is completely apart from the brake pedal 6, that is, when the braking force becomes zero, the electric brake 20 transitions from the thrust force reducing control state to the clearance control state. Under the clearance control state, the electric brake 20 recognizes that the brake pedal 6 is released, and executes the control of increasing the clearances. When each of the clearance amounts reaches a defined amount (defined clearance amount), the electric brake 20 transitions from the clearance control state to the standby state.

When the operation of the brake pedal 6 is started again before each of the clearance amounts reaches the defined amount under the clearance control state, the electric brake 20 does not transition to the standby state, and executes the control of reducing the clearances. In the present invention, the electric brake 20 determines the occurrence of the state in which the brake pedal 6 is operated again before each of the clearance amounts reaches the defined amount, and executes the clearance control so that the braking force is generated at the same timing as that after each of the clearance amounts reaches the defined amount.

Figure 4:
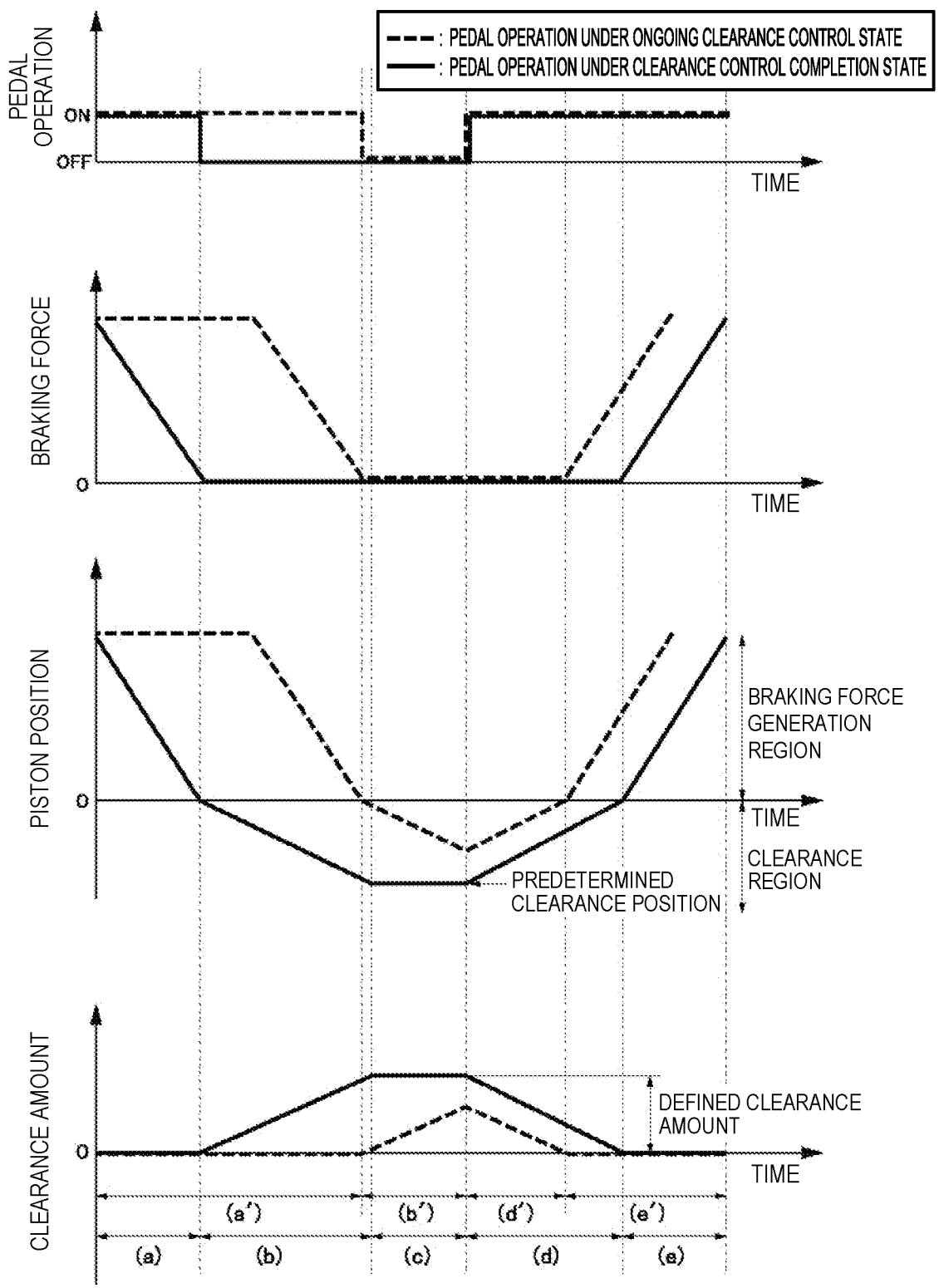
FIG. 4 shows characteristic graphs for showing an example of temporal changes in brake pedal operation, braking force, piston position, and clearance amount in a comparative example.

Before description of the clearance control in the present invention, description is now given of the clearance control in a comparative example with reference to FIG. 4. FIG. 4 shows characteristic graphs for showing time-series waveforms during the control of the electric brake in the comparative example. The solid lines indicate a case in which the braking force generation operation is executed again under the state in which the clearance control has been completed (hereinafter referred to as "pedal operation under the clearance control completion state"). The broken lines indicate a case in which the pedal operation is executed again before each of the clearance amounts reaches the defined value, that is, in the course of the clearance control (hereinafter referred to as "pedal operation under the ongoing clearance control state").

A zero point of the vertical axis for the time-series waveform of the piston position is a position at which the piston 32 and the inner brake pad 22 starts coming in contact or separating apart from each other. A plus side of the piston position indicates a braking force generation region. A minus side of the piston position indicates a clearance region. A section (a) and a section (a') correspond to the thrust force reducing control state. A section (b) and a section (b') correspond to the clearance control state (clearance increasing side). A section (c) corresponds to the standby state. A section (d) and a section (d') correspond to the clearance control state (clearance reducing side). A section (e) and a section (e') correspond to the thrust force increasing control state. The section (a) to the section (e) correspond to the "pedal operation under the clearance control completion state." The section (a') to the section (e') correspond to the "pedal operation under the ongoing clearance control state."

In the case in which the "pedal operation under the clearance control completion state" is to be executed, the brake pedal 6 is gradually released in the section (a) so as to reduce the braking force to zero as indicated by the solid lines of FIG. 4. A state in which the brake pedal 6 is completely released is brought about in the section (b), and the clearances are increased. Then, the operation is stopped in the section (c) in which each of the clearance amounts is the defined clearance amount. At this time, the piston 32 stops at the predetermined clearance position. After that, when the operation on the brake pedal 6 is started again in the section (d), the operation toward the thrust force increasing direction is simultaneously started. Consequently, the control on the side of reducing the clearances is executed, and the brake pads 22 and 23 and the disc rotor D come in contact with each other. As a result, the braking force rises and increases in the section (e).

Meanwhile, in the case in which the "pedal operation under the ongoing clearance control state" is to be executed, as indicated by the broken lines of FIG. 4, the brake pedal 6 is gradually released from the state in which the position of the brake pedal 6 is held in the section (a'), and the braking force is consequently reduced to zero. The state in which the brake pedal 6 is completely released is brought about in the section (b'), and the control on the side of increasing the clearances is executed. However, when the operation on the brake pedal 6 is started before each of the clearance amounts reaches the defined clearance amount, the braking request is generated in the course of the movement of the piston 32 to the predetermined clearance position toward the direction apart from the disc rotor D. In this case, the control toward the side of reducing the clearances is immediately executed in the section (d'). Consequently, the brake pads 22 and 23 and the disc rotor D come in contact with each other at a timing earlier than the timing under the "pedal operation under the clearance control completion state." As a result, the braking force rises and increases in the section (e'). This deviation of the timing of the rise of the braking force leads to the sense of discomfort felt by the driver.

Figure 5:
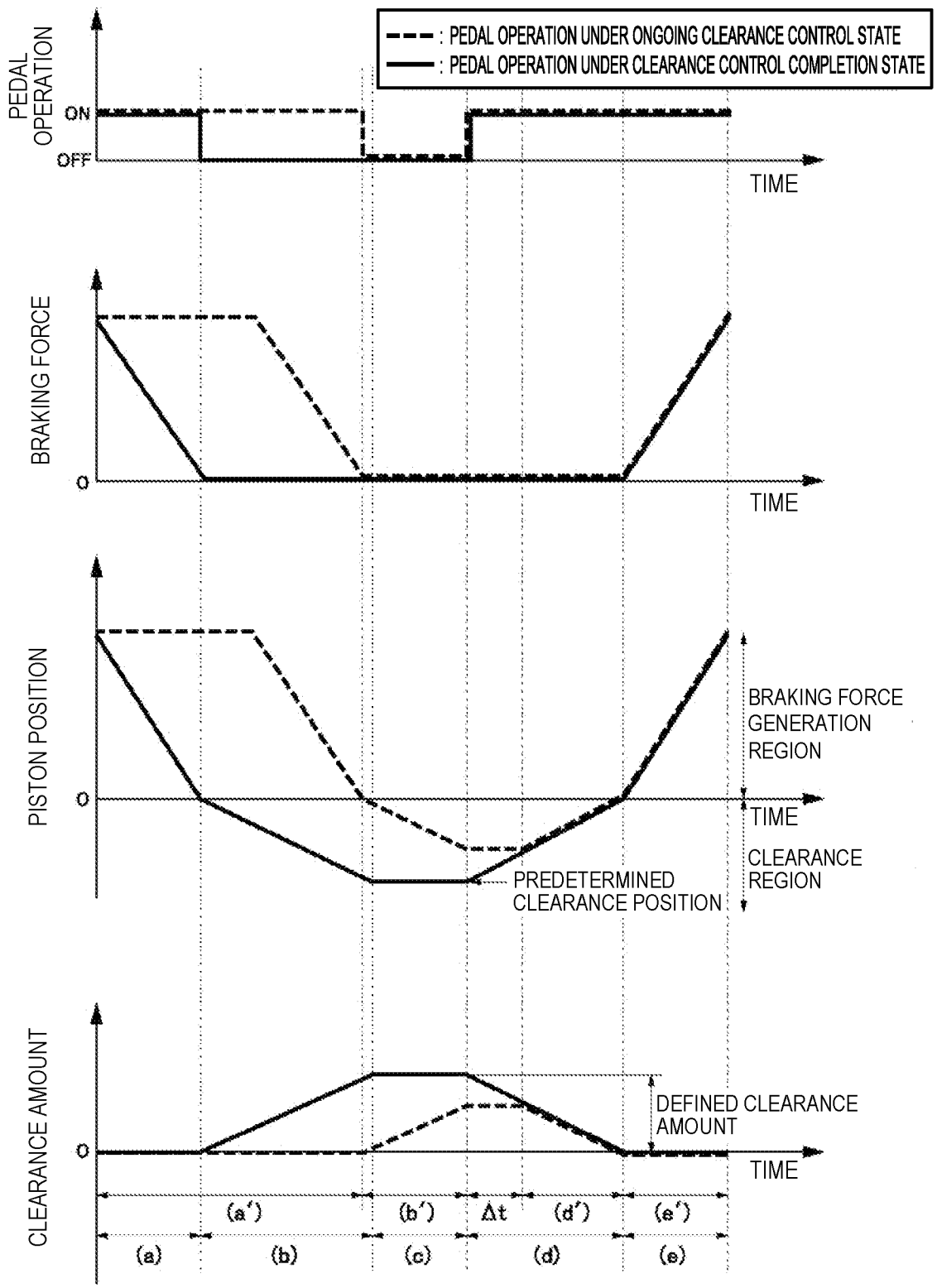
FIG. 5 shows characteristic graphs for showing an example of temporal changes in brake pedal operation, braking force, piston position, and clearance amount in the first embodiment.

With reference to FIG. 5, description is now given of clearance control in a first embodiment of the present invention. FIG. 5 shows graphs for showing time-series waveforms during the control of the electric brake in the first embodiment. The solid lines indicate the case in which the "pedal operation under the clearance control completion state" is executed. The broken lines indicate the case in which the "pedal operation under the ongoing clearance control state" is executed. The case in which the "pedal operation under the clearance control completion state" is executed is the same as that of FIG. 4, and description is thus omitted.

In the case in which the "pedal operation under the ongoing clearance control state" is to be executed, as indicated by the broken lines of FIG. 5, the brake pedal 6 is gradually released from the state in which the position of the brake pedal 6 is held in the section (a'), and the braking force is consequently reduced to zero. The state in which the brake pedal 6 is completely released is brought about in the section (b'), and the control on the side of increasing the clearances is executed. In this state, when the operation on the brake pedal 6 is started before each of the clearance amounts reaches the defined clearance amount, the braking request is generated in the course of the movement of the piston 32 to the predetermined clearance position toward the direction apart from the disc rotor D. In this case, the operation on the brake pedal 6 is detected in the section (b'). In the first embodiment, a section in which the piston 32 is temporarily stopped for a non-operation period ($\Delta t$) is provided before the control toward the side of reducing the clearances is executed in the section (d'). Consequently, the sum of the period of the section (d') and the non-operation period ($\Delta t$) in the case in which the "pedal operation under the ongoing clearance control state" is executed matches the period of the section (d) in the case in which the "pedal operation under the clearance control completion state" is executed. As a result, the timing of the rise of the braking force in the section (e') matches the timing of the rise of the braking force in the case in which the "pedal operation under the clearance control completion state" is executed. In this configuration, the non-operation period ($\Delta t$) is calculated based on Expression 1 and Expression 2.

Expression 1

Clearance Difference Value=Defined Clearance Amount-Current Clearance Amount

Expression 2

Non-Operation Period=Clearance Difference Value/Piston Speed

The current clearance amount of Expression 1 is calculated through use of each of the clearance amounts at the timing at which the operation on the brake pedal 6 is resumed. The piston speed of Expression 2 is calculated through use of a set value during the clearance control.

Figure 6:
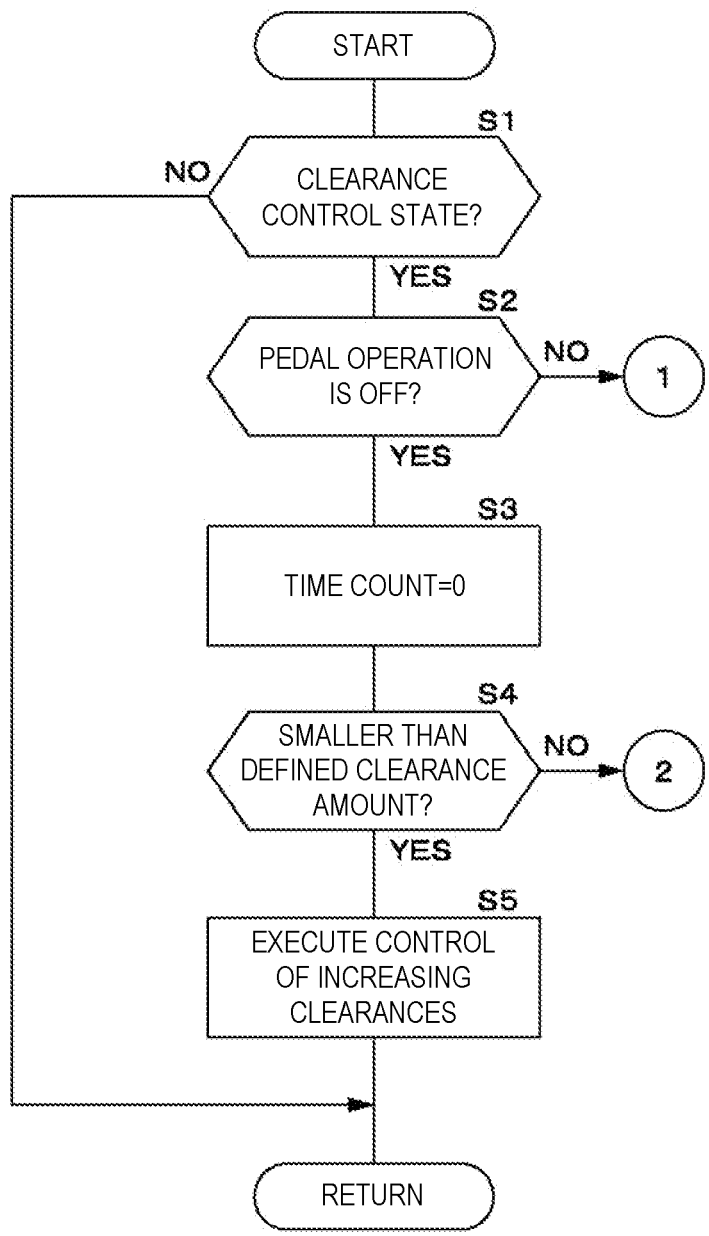
FIG. 6 is a flowchart for illustrating clearance control in the first embodiment.
Figure 7:
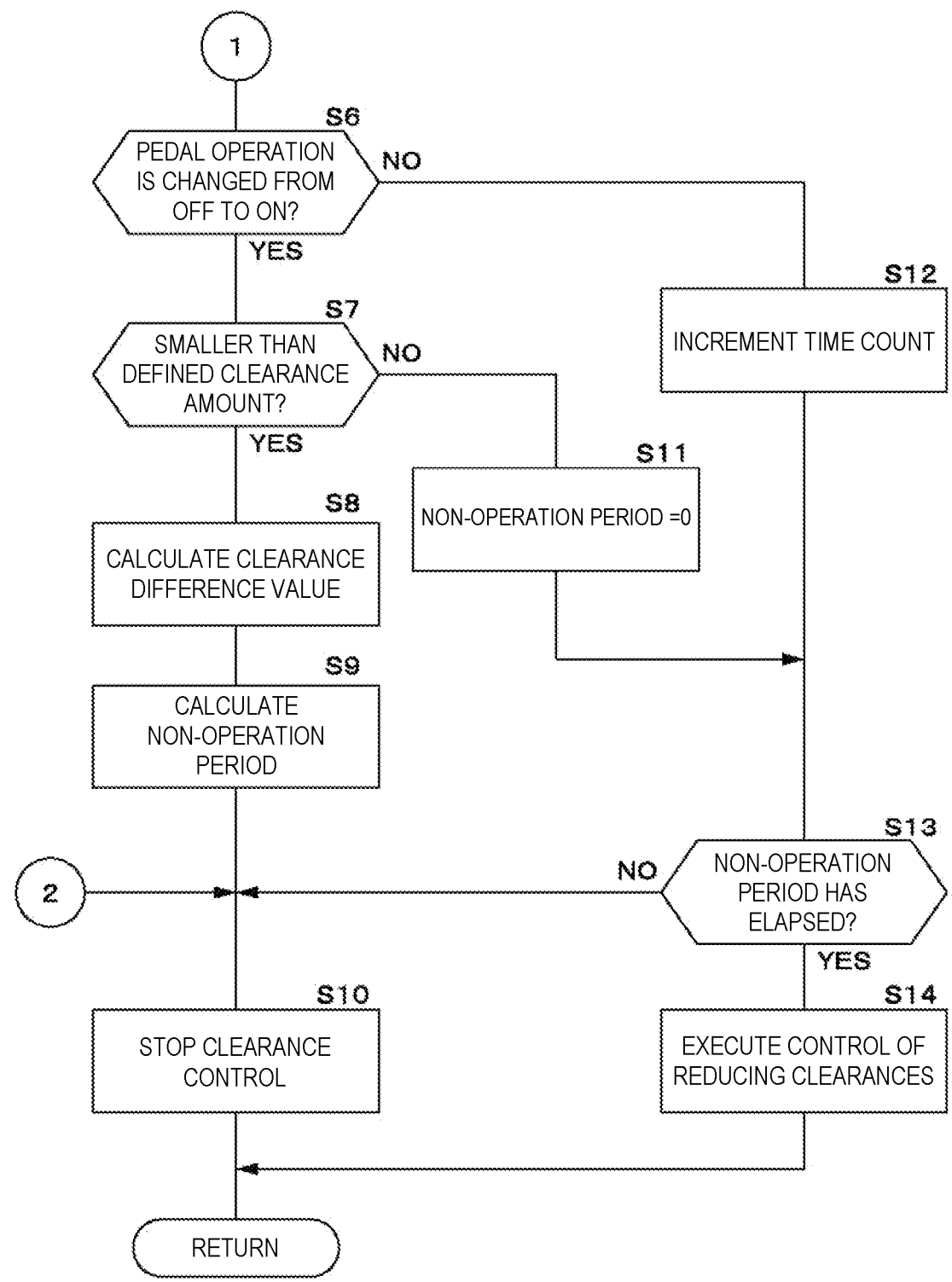
FIG. 7 is a flowchart following FIG. 6.

With reference to flowcharts of FIG. 6 and FIG. 7, description is now given of the clearance control in the first embodiment. The program illustrated in FIG. 6 and FIG. 7 is repeated at predetermined cycles after, for example, an ignition switch is operated to ON. Moreover, notation "S" is used for a step of the flowcharts illustrated in FIG. 6 and FIG. 7, and, for example, Step 1 is thus denoted by "S1."

In Step S1 of FIG. 6, the program determines whether or not the current state is the clearance control state. When the current state is not the clearance control state, the program makes a determination of "NO" in Step S1, and returns. When the current state is the clearance control state, the program makes a determination of "YES" in Step S1, and proceeds to Step S2.

In Step S2, the program determines whether or not the operation on the brake pedal 6 is OFF. When the operation on the brake pedal 6 is not present, the operation on the brake pedal 6 is OFF, and the program thus makes a determination of "YES" in Step S2, and proceeds to Step S3. When the operation on the brake pedal 6 is present, the operation on the brake pedal 6 is ON, and the program thus makes a determination of "NO" in Step S2, and proceeds to Step S6.

In Step S3, the program sets a time count for measuring the non-operation period to zero, and proceeds to Step S4. The time count is used to measure a period from the timing at which the operation on the brake pedal 6 becomes ON. It is thus required to reset the time count (to set the time count to zero) when the operation on the brake pedal 6 is OFF.

In Step S4, the program determines whether or not each of the clearance amounts obtained from, for example, the rotational position of the electric motor 39 is smaller than (has not reached) the defined clearance amount. When each of the clearance amounts is smaller than the defined clearance amount, the clearance control has not been completed. Thus, the program makes a determination of "YES" in Step S4, and proceeds to Step S5. In Step S5, the program starts or continues the control on the side of increasing the clearances. That is, in Step S5, the program causes the electric motor 39 to execute the drive toward the thrust force reducing direction, and returns. When each of the clearance amounts is equal to or larger than (has reached) the defined clearance amount, the clearance control has been completed. Thus, the program makes a determination of "NO" in Step S4, and proceeds to Step S10. In Step S10, the program stops the clearance control, and returns. Consequently, the state transitions from the clearance control state to the standby state.

In Step S6, the program determines whether or not the current timing is the timing at which the operation on the brake pedal 6 is switched from OFF to ON. When the current timing is the timing at which the operation on the brake pedal 6 is switched, the program makes a determination of "YES" in Step S6, and proceeds to Step S7. When the current timing is not the timing at which the operation on the brake pedal 6 is switched, that is, when the operation on the brake pedal 6 is continuing to be in the ON state, the program makes a determination of "NO" in Step S6, and proceeds to Step S12.

In Step S7, the program determines whether or not each of the clearance amounts is smaller than the defined clearance amount at the timing at which the operation on the brake pedal 6 is switched from OFF to ON. That is, in Step S7, the program determines whether or not the current timing is a timing at which the driver starts the operation on the brake pedal 6 while the clearances are being increased.

When each of the clearance amounts is smaller than the defined clearance amount, the program makes a determination of "YES" in Step S7, and proceeds to Step S8. In Step S8, the program calculates the clearance difference value based on Expression 1, and proceeds to Step S9. In Step S9, the program calculates the non-operation period of a temporary stop section based on Expression 2, and proceeds to Step S10. In Step S10, the program stops the electric motor 39, and returns.

When each of the clearance amounts is equal to or larger than the defined clearance amount, the non-operation period is not required to be provided, the program thus makes a determination of "NO" in Step S7, and proceeds to Step S11. In Step S11, the program sets the non-operation period to zero, and proceeds to Step S13. In Step S13, the program determines whether or not the period measured based on the time count has reached the non-operation period. When the non-operation period was set to zero in Step S11, the period measured based on the time count has reached the non-operation period. Thus, the program makes a determination of "YES" in Step S13, and proceeds to Step S14. In Step S14, the program executes control on the side of reducing the clearances, causes the electric motor 39 to execute the drive toward the thrust force increasing direction, and returns.

In Step S12, the program increments the time count in order to measure the period in which the operation on the brake pedal 6 is continuing, and proceeds to Step S13. In Step S13, the program compares the non-operation period set in Step S9 or Step S11 and the period measured based on the time count with each other. When the period measured based on the time count is shorter than the non-operation period, the program makes a determination of "NO" in Step S13, and proceeds to Step S10. In Step S10, the program continues to stop the electric motor 39 in order to continue the temporary stop, and returns.

When the period measured based on the time count is equal to or longer than the non-operation period, the temporary stop section is finished. Thus, the program thus makes a determination of "YES" in Step S13, and proceeds to Step S14. In Step S14, the program causes the electric motor 39 to execute the drive toward the thrust force increasing direction, and returns.

As a result, in the first embodiment, the ECU 11 (control device) for rear electric brake drives the electric motor 39 so that the period from the braking request to the time at which the brake pads 22 and 23 (braking members) start pressing the disc rotor D (braked member) is the predetermined period regardless of the position of the piston 32 at the time of the generation of the braking request.

That is, the ECU 11 for rear electric brake controls the drive of the electric motor 39 of the brake mechanism 21 configured to transmit the thrust force generated through the drive of the electric motor 39 to the piston 32 configured to move the brake pads 22 and 23 to be pressed against the disc rotor D based on the braking request so that the period from the braking request to the time at which the brake pads 22 and 23 start pressing the disc rotor D is constant regardless of the position of the piston 32 at the time of the generation of the braking request.

Consequently, even when each of the clearance amounts between each of the brake pads 22 and 23 and the disc rotor D at the time of the generation of the braking request changes, the difference in time of generation of the braking force can be suppressed. As a result, the timing of the generation of the braking force can be set to be as the same as possible, and the sense of discomfort felt by the driver can be suppressed.

Moreover, when the braking request is made while the ECU 11 for rear electric brake is moving the piston 32 to the predetermined clearance position toward the direction apart from the disc rotor D, the ECU 11 for rear electric brake sets the predetermined period so as to be the same as the period required for the piston 32 having been at the predetermined clearance position to start pressing the disc rotor D.

In the first embodiment, when the braking request is made while the ECU 11 for rear electric brake is moving the piston 32 to the predetermined clearance position toward the direction apart from the disc rotor D, the ECU 11 for rear electric brake maintains the position (thrust force) of the piston 32, to thereby change the period from the braking request to the time at which the brake pads 22 and 23 start pressing the disc rotor D to the predetermined period. Specifically, the ECU 11 for rear electric brake adjusts the non-operation period, which is the period in which the position of the piston 32 is maintained, in accordance with each of the clearance amounts (current clearance amounts) at the time when the braking request is generated. Consequently, regardless of the position of the piston 32 at the time of the generation of the braking request, the period from the braking request to the time at which the brake pads 22 and 23 start pressing the disc rotor D can be set to the constant predetermined period.

Figure 8:
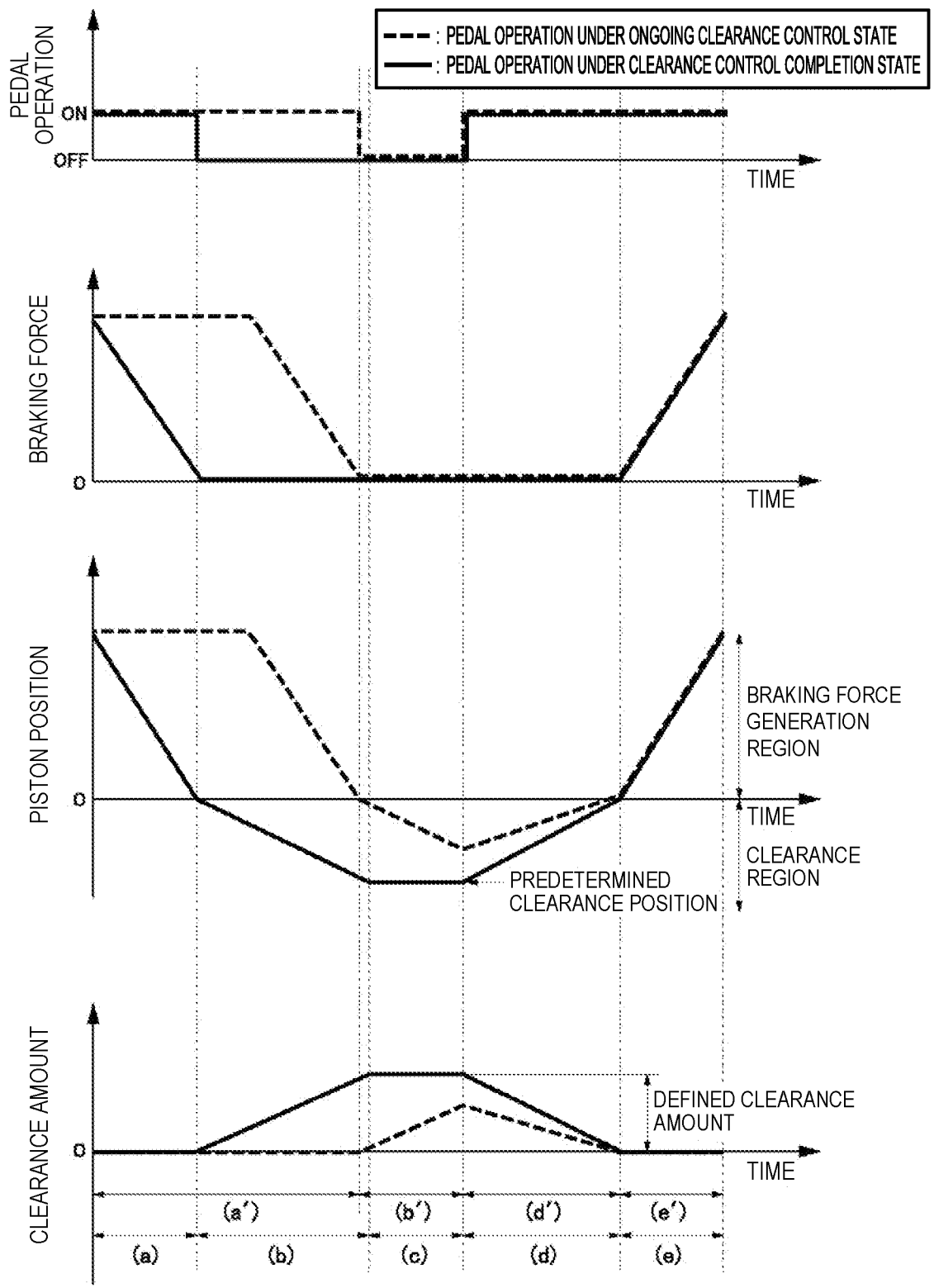
FIG. 8 shows characteristic graphs for showing an example of temporal changes in brake pedal operation, braking force, piston position, and clearance amount in a second embodiment of the present invention.
Figure 9:
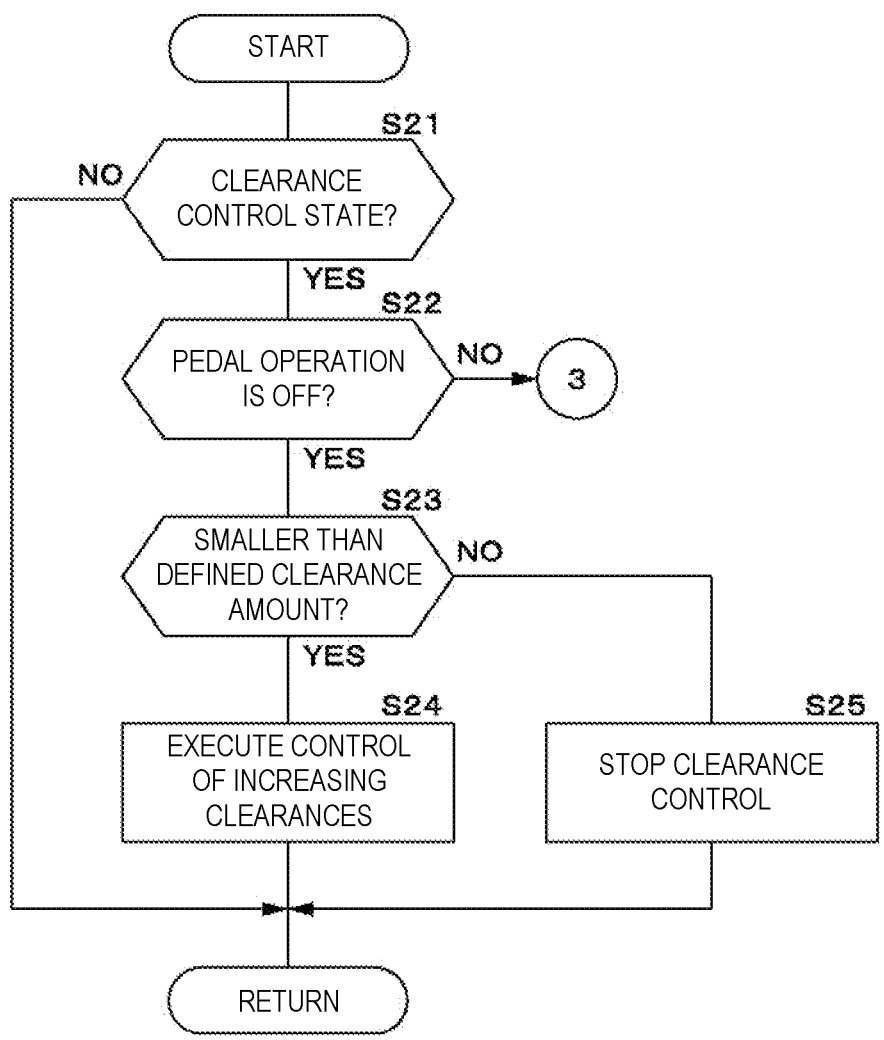
FIG. 9 is a flowchart for illustrating clearance control in the second embodiment.
Figure 10:
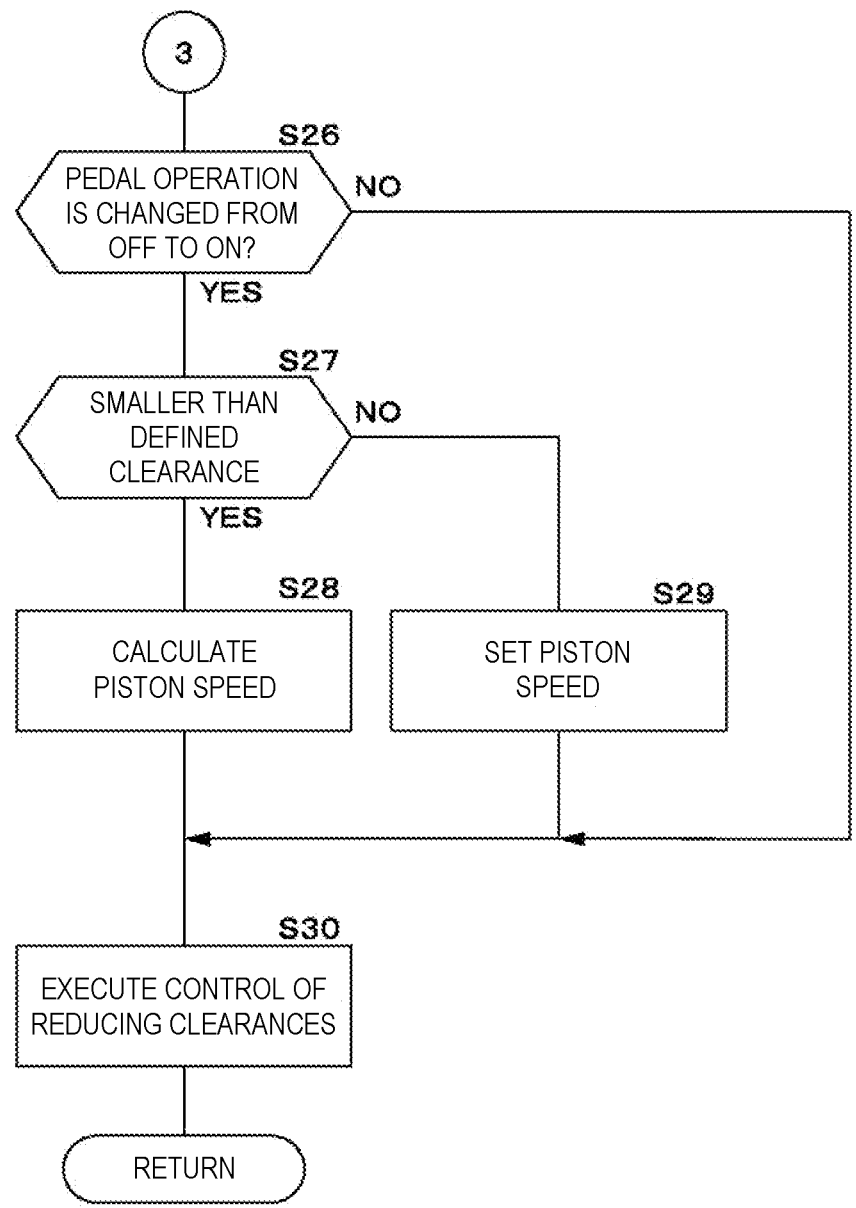
FIG. 10 is a flowchart following FIG. 9.

Next, FIG. 8 to FIG. 10 show a second embodiment of the present invention. A feature of the second embodiment is that when the braking request is made while the ECU for rear electric brake is moving the piston to the predetermined clearance position toward the direction apart from the disc rotor, the ECU for rear electric brake reduces a moving speed of the piston compared with the case in which the braking is executed from the state in which the piston is at the predetermined clearance position, to thereby adjust the period from the braking request to the start of the pressing of the disc rotor by the brake pads to the predetermined period. In the second embodiment, the same components as those of the first embodiment are denoted by the same reference symbols and numerals, and description thereof is omitted.

With reference to FIG. 8, description is now given of clearance control in the second embodiment. FIG. 8 shows graphs for showing time-series waveforms during the control of the electric brake in the second embodiment. The solid lines indicate the case in which the "pedal operation under the clearance control completion state" is executed.

The broken lines indicate the case in which the "pedal operation under the ongoing clearance control state" is executed.

In the case in which the "pedal operation under the ongoing clearance control state" is to be executed, as indicated by the broken lines of FIG. 8, the brake pedal 6 is gradually released from the state in which the position of the brake pedal 6 is held in the section (a'), and the braking force is consequently reduced to zero. The operation on the brake pedal 6 is detected in the section (b'). Consequently, the braking request is generated in the course of the movement of the piston 32 to the predetermined clearance position toward the direction apart from the disc rotor D. As a result, the section (b') transitions to the section (d'), and the control on the side of reducing the clearances is immediately executed. In the section (d'), the moving speed of the piston 32 (piston speed) is reduced compared with that in the case in which the "pedal operation under the clearance control completion state" is executed. Consequently, the timing of the rise of the braking force in the section (e') matches the timing in the case in which the "pedal operation under the clearance control completion state" is executed. In this configuration, the piston speed is calculated based on Expression 3.

Expression 3

Piston speed=Current clearance amount/Defined period

The current clearance amount of Expression 3 is calculated through use of each of the clearance amounts at the timing at which the operation on the brake pedal 6 is resumed. The defined period of Expression 3 is calculated through use of the same value as the period of the section (d) in which the clearance is to be reduced when the "pedal operation under the clearance control completion state" is executed.

With reference to flowcharts of FIG. 9 and FIG. 10, description is now given of the clearance control in the second embodiment. The program illustrated in FIG. 9 and FIG. 10 is repeated at predetermined cycles after, for example, the ignition switch is operated to ON. Moreover, notation "S" is used for a step of the flowcharts illustrated in FIG. 9 and FIG. 10, and, for example, Step 21 is thus denoted by "S21."

In Step S21 of FIG. 9, the program determines whether or not the current state is the clearance control state. When the current state is not the clearance control state, the program makes a determination of "NO" in Step S21, and returns. When the current state is the clearance control state, the program makes a determination of "YES" in Step S21, and proceeds to Step S22.

In Step S22, the program determines whether or not the operation on the brake pedal 6 is OFF. When the operation on the brake pedal 6 is not present, the program makes a determination of "YES" in Step S22, and proceeds to Step S23. When the operation on the brake pedal 6 is present, the program makes a determination of "NO" in Step S22, and proceeds to Step S26.

In Step S23, the program determines whether or not each of the clearance amounts is smaller than (has not reached) the defined clearance amount. When each of the clearance amounts is smaller than the defined clearance amount, the program makes a determination of "YES" in Step S23, and proceeds to Step S24. In Step S24, the program starts or continues the control on the side of increasing the clearances, and returns. When each of the clearance amounts is equal to or larger than (has reached) the defined clearance amount, the program makes a determination of "NO" in Step S23, and proceeds to Step S25. In Step S25, the program stops the clearance control, and returns. Consequently, the state transitions from the clearance control state to the standby state.

In Step S26, the program determines whether or not the current timing is the timing at which the operation on the brake pedal 6 is switched from OFF to ON. When the current timing is the timing at which the operation on the brake pedal 6 is switched, the program makes a determination of "YES" in Step S26, and proceeds to Step S27. When the current timing is not the timing at which the operation on the brake pedal 6 is switched, the program makes a determination of "NO" in Step S26, and proceeds to Step S30.

In Step S27, the program determines whether or not each of the clearance amounts is smaller than the defined clearance amount at the timing at which the operation on the brake pedal 6 is switched from OFF to ON. That is, in Step S27, the program determines whether or not the current timing is a timing at which the driver starts the operation on the brake pedal 6 while the clearances are being increased.

When each of the clearance amounts is smaller than the defined clearance amount, the program makes a determination of "YES" in Step S27, and proceeds to Step S28. In Step S28, the program calculates the piston speed based on Expression 3, and proceeds to Step S30. In Step S30, the program causes the electric motor 39 to execute the drive toward the thrust force increasing direction based on the calculated piston speed, and returns.

When each of the clearance amounts is equal to or larger than the defined clearance amount, the piston speed is not required to be reduced. Thus, the program makes a determination of "NO" in Step S27, and proceeds to Step S29. In Step S29, the program sets the piston speed to a normal speed determined in advance, and proceeds to Step S30. In Step S30, the program causes the electric motor 39 to execute the drive toward the thrust force increasing direction based on the piston speed set to the normal speed, and returns.

As described above, also in the second embodiment, there can be provided an action and an effect which are substantially the same as those in the first embodiment. Further, in the second embodiment, when the braking request is made while the ECU 11 for rear electric brake (control device) is moving the piston 32 to the predetermined clearance position toward the direction apart from the disc rotor D, the ECU 11 for rear electric brake reduces the moving speed of the piston 32 compared with the case in which the braking is executed from the state in which the piston 32 is at the predetermined clearance position, to thereby adjust the period from the braking request to the start of the pressing of the disc rotor D by the brake pads 22 and 23 to the predetermined period.

Consequently, even when each of the clearance amounts between each of the brake pads 22 and 23 and the disc rotor D at the time of the generation of the braking request changes, the difference in time of generation of the braking force can be suppressed. As a result, the timing of the generation of the braking force can be set to be as the same as possible, and the sense of discomfort felt by the driver can be suppressed.

Figure 11:
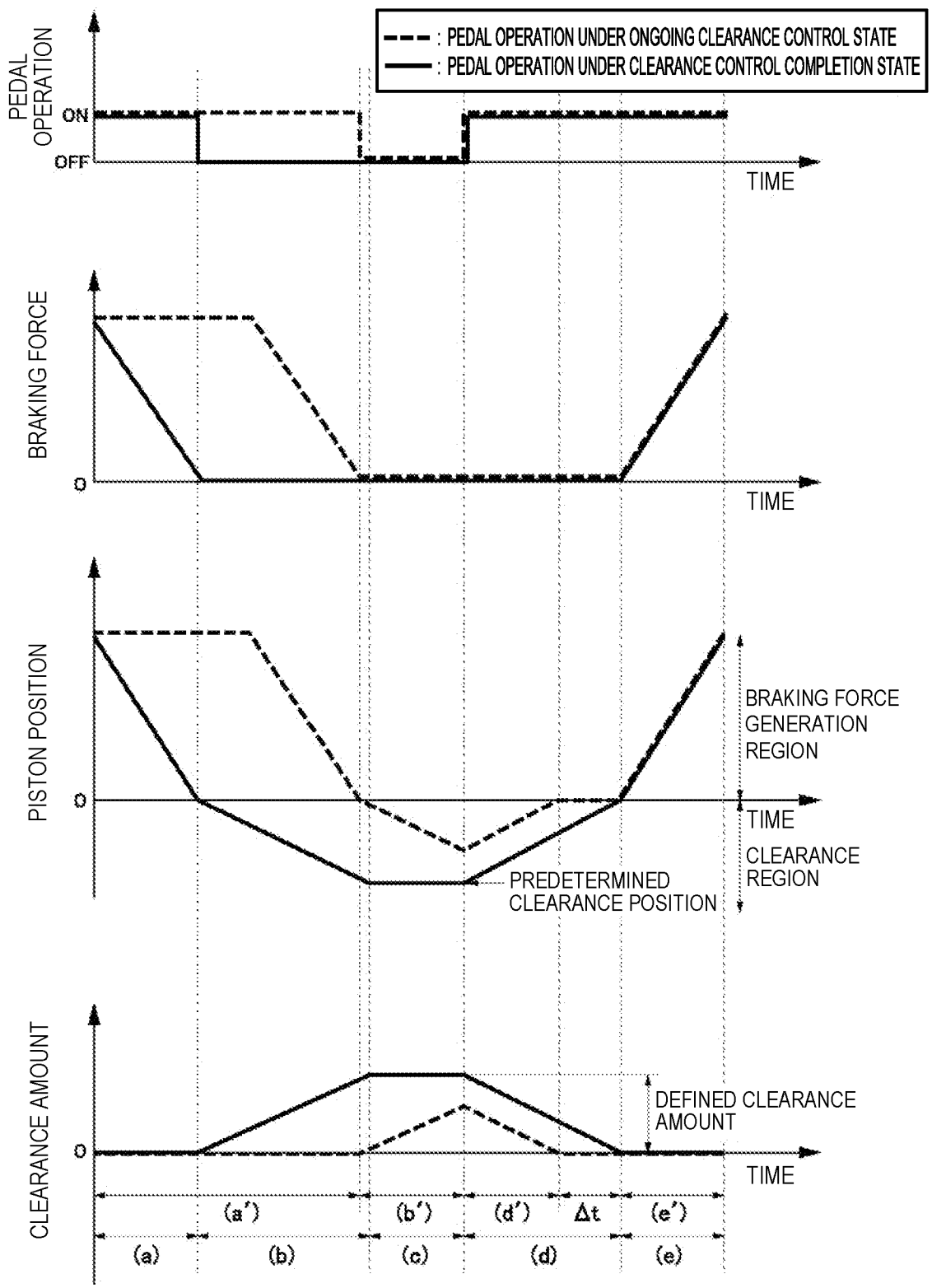
FIG. 11 shows characteristic graphs for showing an example of temporal changes in brake pedal operation, braking force, piston position, and clearance amount in a third embodiment of the present invention.
Figure 12:
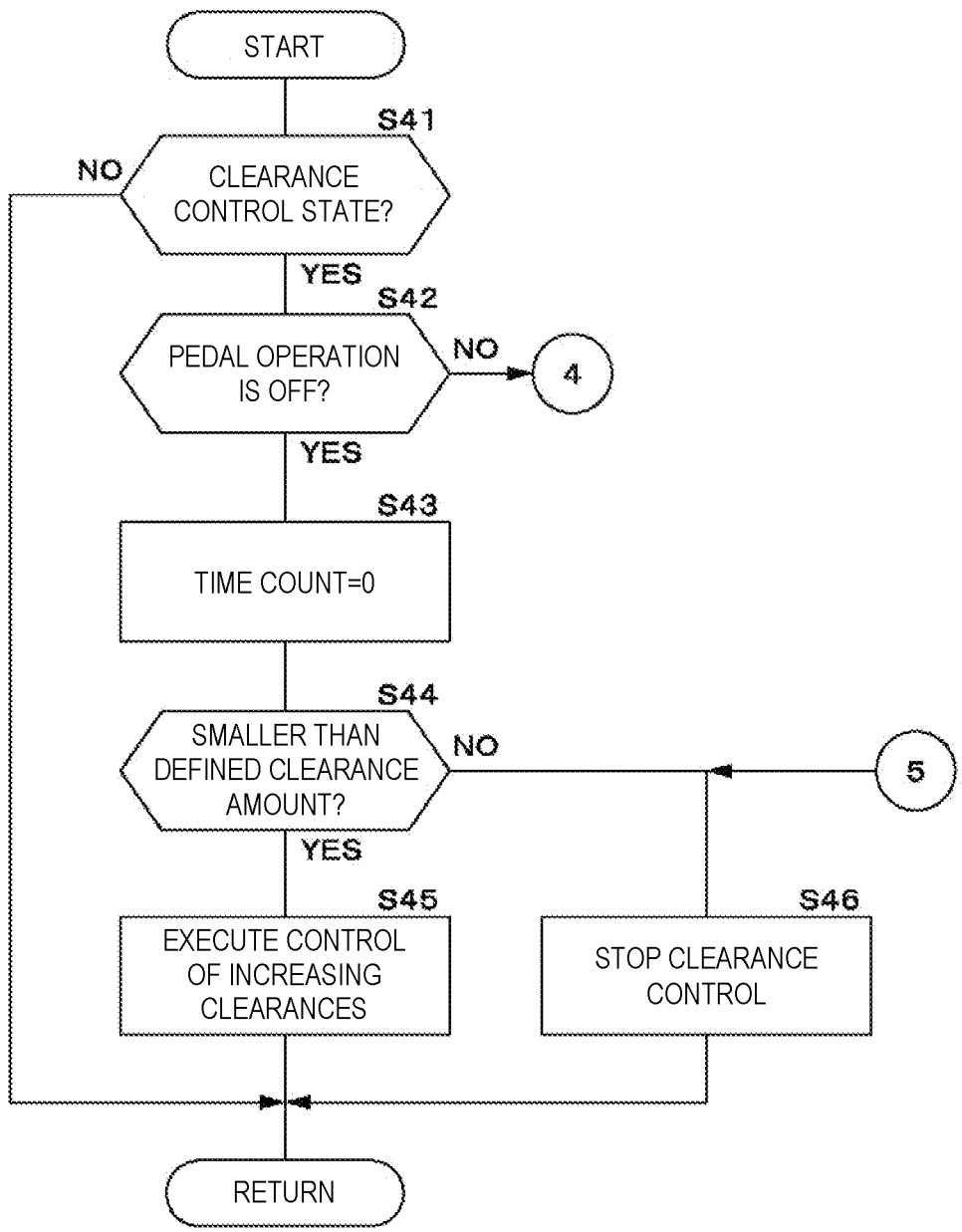
FIG. 12 is a flowchart for illustrating clearance control in the third embodiment.
Figure 13:
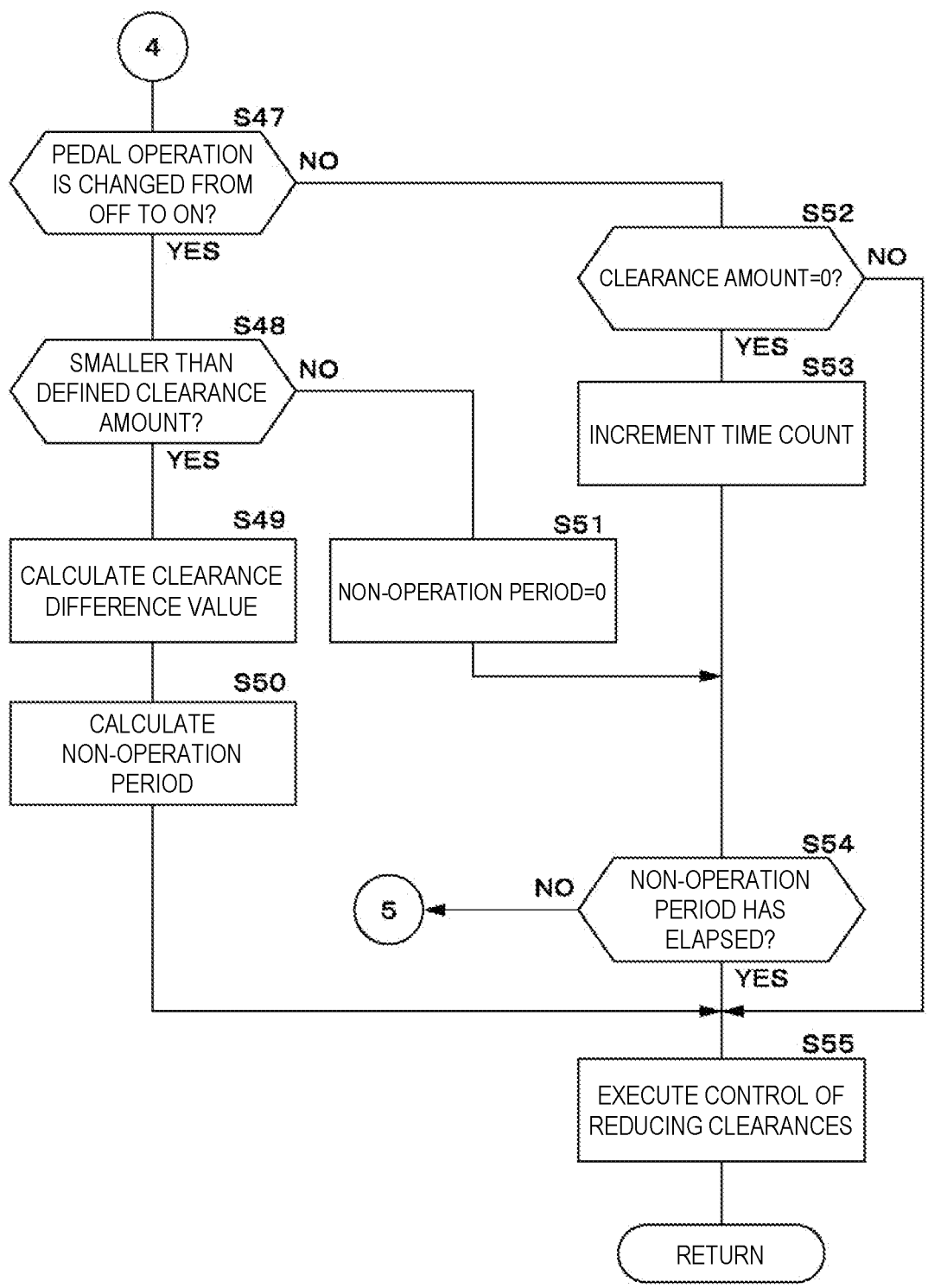
FIG. 13 is a flowchart following FIG. 12.

Next, FIG. 11 to FIG. 13 show a third embodiment of the present invention. A feature of the third embodiment is that when the ECU for rear electric brake stops the operation of the piston in accordance with the clearance amounts, the ECU for rear electric brake stops the piston after the clearance amounts have been reduced. In the third embodiment, the same components as those of the first embodiment are denoted by the same reference symbols, and description thereof is omitted.

With reference to FIG. 11, description is now given of clearance control in the third embodiment. FIG. 11 shows characteristic graphs for showing time-series waveforms during the control of the electric brake in the third embodiment. The solid lines indicate the case in which the "pedal operation under the clearance control completion state" is executed. The broken lines indicate the case in which the "pedal operation under the ongoing clearance control state" is executed.

In the case in which the "pedal operation under the ongoing clearance control state" is to be executed, as indicated by the broken lines of FIG. 11, the brake pedal 6 is gradually released from the state in which the position of the brake pedal 6 is held in the section (a'), and the braking force is consequently reduced to zero. The state in which the brake pedal 6 is completely released is brought about in the section (b'), and the control on the side of increasing the clearances is executed. In this state, when the operation on the brake pedal 6 is started before each of the clearance amounts reaches the defined clearance amount, the braking request is generated in the course of the movement of the piston 32 to the predetermined clearance position toward the direction apart from the disc rotor D. In this case, the operation on the brake pedal 6 is detected in the section (b'). The control on the side of reducing the clearances is executed in the following section (d'). Before the rise of the braking force in the section (e'), the section for the temporary stop for the non-operation period (Δt) is provided. That is, the clearance amounts having been increased in the section (b') are reduced in the section (d'), and the piston 32 is temporally stopped at a timing at which each of the clearance amounts becomes zero. Consequently, the timing of the rise of the braking force in the section (e') matches the timing in the case in which the "pedal operation under the clearance control completion state" is executed. In this case, the non-operation period (Δt) is calculated based on Expression 1 and Expression 2.

When the section for the temporary stop is to be provided, it is only required that the sum of the period of the section (d') and the non-operation period (Δt) be the same value as the period of the section (d). Thus, the section for the temporary stop may be set to any position in the section (d).

With reference to flowcharts of FIG. 12 and FIG. 13, description is now given of the clearance control in the third embodiment. The program illustrated in FIG. 12 and FIG. 13 is repeated at predetermined cycles after, for example, the ignition switch is operated to ON. Moreover, notation "S" is used for a step of the flowcharts illustrated in FIG. 12 and FIG. 13, and, for example, Step 41 is thus denoted by "S41."

In Step S41 of FIG. 12, the program determines whether or not the current state is the clearance control state. When the current state is not the clearance control state, the program makes a determination of "NO" in Step S41, and returns. When the current state is the clearance control state, the program makes a determination of "YES" in Step S41, and proceeds to Step S42.

In Step S42, the program determines whether or not the operation on the brake pedal 6 is OFF. When the operation on the brake pedal 6 is not present, the program makes a determination of "YES" in Step S42, and proceeds to Step S43. When the operation on the brake pedal 6 is present, the program makes a determination of "NO" in Step S42, and proceeds to Step S47.

In Step S43, the program sets a time count for measuring the non-operation period to zero, and proceeds to Step S44. In Step S44, the program determines whether or not each of the clearance amounts is smaller than (has not reached) the defined clearance amount. When each of the clearance amounts is smaller than the defined clearance amount, the program makes a determination of "YES" in Step S44, and proceeds to Step S45. In Step S45, as the control on the side of increasing the clearances, the program causes the electric motor 39 to execute the drive toward the thrust force reducing direction, and returns. When each of the clearance amounts is equal to or larger than (has reached) the defined clearance amount, the program makes a determination of "NO" in Step S44, and proceeds to Step S46. In Step S46, the program stops the clearance control, and returns.

In Step S47, the program determines whether or not the current timing is the timing at which the operation on the brake pedal 6 is switched from OFF to ON. When the current timing is the timing at which the operation on the brake pedal 6 is switched, the program makes a determination of "YES" in Step S47, and proceeds to Step S48. When the current timing is not the timing at which the operation on the brake pedal 6 is switched, the program makes a determination of "NO" in Step S47, and proceeds to Step S52.

In Step S48, the program determines whether or not each of the clearance amounts is smaller than the defined clearance amount at the timing at which the operation on the brake pedal 6 is switched from OFF to ON. That is, in Step S48, the program determines whether or not the current timing is a timing at which the driver starts the operation on the brake pedal 6 while the clearances are being increased.

When each of the clearance amounts is smaller than the defined clearance amount, the program makes a determination of "YES" in Step S48, and proceeds to Step S49. In Step S49, the program calculates the clearance difference value based on Expression 1, and proceeds to Step S50. In Step S50, the program calculates the non-operation period of a temporary stop section based on Expression 2, and proceeds to Step S55. In Step S55, as the control on the side of reducing the clearances, the program causes the electric motor 39 to execute the drive toward the thrust force increasing direction, and returns.

When each of the clearance amounts is equal to or larger than the defined clearance amount, the program makes a determination of "NO" in Step S48, and proceeds to Step S51. In Step S51, the program sets the non-operation period to zero, and proceeds to Step S54. In Step S54, the program determines whether or not the period measured based on the time count has reached the non-operation period. When the non-operation period was set to zero in Step S51, the period measured based on the time count has reached the non-operation period, and the program thus makes a determination of "YES" in Step S54, and proceeds to Step S55. In Step S55, the program executes control on the side of reducing the clearances, causes the electric motor 39 to execute the drive toward the thrust force increasing direction, and returns.

In Step S52, the program determines whether or not each of the clearance amounts is zero. When each of the clearance amounts is not zero, the program makes a determination of "NO" in Step S52, and proceeds to Step S55. In Step S55, the program executes the control on the side of reducing the clearances, and returns. When each of the clearance amounts is zero, the program makes a determination of "YES" in Step S52, and proceeds to Step S53.

In Step S53, the program increments the time count in order to measure the period in which the operation on the brake pedal 6 is continuing, and proceeds to Step S54. In Step S54, the program compares the non-operation period set in Step S50 or Step S51 and the period measured based on the time count with each other. In this case, the period measured based on the time count is the period after each of the clearance amounts became zero. When the period measured based on the time count is shorter than the non-operation period, the program makes a determination of "NO" in Step S54, and proceeds to Step S46. In Step S46, the program continues to stop the electric motor 39 in order to continue the temporary stop, and returns.

When the period measured based on the time count is equal to or longer than the non-operation period, the temporary stop section is finished. Thus, the program thus makes a determination of "YES" in Step S54, and proceeds to Step S55. In Step S55, the program causes the electric motor 39 to execute the drive toward the thrust force increasing direction, and returns. Consequently, the state transitions from the clearance control state to the thrust force increasing control state.

The determination condition to be used in Step S52 may be changed. The start timing of the temporary stop section can be changed by changing the determination condition. For example, in Step S52, the program may determine whether or not each of the clearance amounts is a predetermined value (for example, the predetermined value=0.1) larger than 0. In this case, when each of the clearance amounts reaches the predetermined value, the temporary stop section is to be started.

As described above, also in the third embodiment, there can be provided an action and an effect which are substantially the same as those in the first embodiment.

In each of the embodiments, the electric brakes 20 are applied to the rear wheels 5L and 5R, but the electric brakes 20 may be applied to the front wheels 3L and 3R, or the electric brakes 20 may be applied to all of the four wheels.

As the electric brake according to the above-mentioned embodiments, for example, the following aspects are conceivable.

As a first aspect, there is provided an electric brake including: a brake mechanism configured to transmit, based on a braking request, a thrust force generated through drive of an electric motor to a piston configured to move braking members to be pressed against a braked member; and a control device configured to control the drive of the electric motor, and to move, in a non-braking state, the piston to a predetermined clearance position at which a clearance between each of the braking members and the braked member is a predetermined amount, wherein the control device is configured to drive the electric motor so that a period from generation of the braking request to a start of the pressing of the braked member by the braking members is a predetermined period regardless of a position of the piston at a time when the braking request is generated.

As a second aspect, in the first aspect, when the braking request is generated during a period in which the control device is moving the piston to the predetermined clearance position toward a direction apart from the braked member, the control device sets the predetermined period to be the same as a period until the piston having been at the predetermined clearance position starts pressing the braked member.

As a third aspect, in the first or second aspect, when the braking request is generated during the period in which the control device is moving the piston to the predetermined clearance position toward a direction apart from the braked member, the control device maintains the position of the piston, to thereby set the period from the generation of the braking request to the start of the pressing of the braked member by the braking members to the predetermined period.

As a fourth aspect, in the first or second aspect, when the braking request is generated during the period in which the control device is moving the piston to the predetermined clearance position toward a direction apart from the braked member, the control device decelerates a moving speed of the piston compared with a case in which the piston is moved from the predetermined clearance position, to thereby set the period from the generation of the braking request to the start of the pressing of the braked member by the braking members to the predetermined period.

Moreover, as the control device according to the embodiments, for example, the following aspect is conceivable.

As a fifth aspect, there is provided a control device, the control device being configured to: control drive of an electric motor of a brake mechanism configured to transmit, based on a braking request, a thrust force generated through drive of the electric motor to a piston configured to move braking members to be pressed against a braked member; and drive the electric motor so that a period from generation of the braking request to a start of the pressing of the braked member by the braking members is a predetermined period regardless of a position of the piston at a time when the braking request is generated.

Note that, the present invention is not limited to the above-mentioned embodiments, and includes further various modification examples. For example, in the above-mentioned embodiments, the configurations are described in detail in order to clearly describe the present invention, and the present invention is not necessarily limited to an embodiment that includes all the configurations that have been described. Further, a part of the configuration of a given embodiment can be replaced by the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2018-180345 filed on Sep. 26, 2018. All disclosed contents including Specification, Scope of Claims, Drawings, and Abstract of Japanese Patent Application No. 2018-180345 filed on Sep. 26, 2018 are incorporated herein by reference in their entirety.

REFERENCE SIGNS LIST

11 ECU for rear electric brake (control device), 20 electric brake, 21 brake mechanism, 22 inner brake pad (braking member), 23 outer brake pad (braking member), 24 caliper, 32 piston, 35 spur gear multistage speed reduction mechanism, 36 planetary gear speed reduction mechanism, 37 carrier, 39 electric motor, 40 rotating shaft, 41 ball screw mechanism, D disc rotor (braked member)

The invention claimed is:

1. An electric brake, comprising:
a brake mechanism configured to transmit, based on a braking request, a thrust force generated through drive of an electric motor to a piston configured to move braking members to be pressed against a braked member; and
a control device configured to control the drive of the electric motor, and to move, in a non-braking state, the piston to a predetermined clearance position at which a clearance between each of the braking members and the braked member is a predetermined amount, wherein the control device is configured to drive the electric motor so that a period from generation of the braking request to a start of the pressing of the braked member by the braking members is a predetermined period regardless of a position of the piston at a time when the braking request is generated, and wherein, when the braking request is generated during a period in which the control device is moving the piston to the predetermined clearance position in a direction apart from the braked member, the control device is configured to set the period from the generation of the braking request to a start of pressing of the braked member to be the same as the predetermined period when the piston is at the predetermined clearance position.

2. The electric brake according to claim 1, wherein, when the braking request is generated during a period in which the control device is moving the piston to the predetermined clearance position toward a direction apart from the braked member, the control device is configured to maintain the position of the piston, to thereby set the period from the generation of the braking request to the start of the pressing of the braked member by the braking members to the predetermined period.

3. The electric brake according to claim 1, wherein, when the braking request is generated during a period in which the control device is moving the piston to the predetermined clearance position toward a direction apart from the braked member, the control device is configured to decelerate a moving speed of the piston compared with a case in which the piston is moved from the predetermined clearance position, to thereby set the period from the generation of the braking request to the start of the pressing of the braked member by the braking members to the predetermined period.

4. A control device, the control device being configured to:
control drive of an electric motor of a brake mechanism configured to transmit, based on a braking request, a thrust force generated through drive of the electric motor to a piston configured to move braking members to be pressed against a braked member;
drive the electric motor so that a period from generation of the braking request to a start of the pressing of the braked member by the braking members is a predetermined period regardless of a position of the piston at a time when the braking request is generated; and
set the period from generation of the braking request to a start of pressing of the braked member to be the same as a period until the piston having been at the the predetermined period when the piston is at a predetermined clearance position when the braking request is generated during a period in which the control device is moving the piston to the predetermined clearance position in a direction apart from the braked member.

* * * * *